United States Patent
Gewert et al.

(10) Patent No.: US 10,464,516 B2
(45) Date of Patent: Nov. 5, 2019

(54) ENERGY-ABSORBING KNEE BOLSTER FRAME FOR A VEHICLE

(71) Applicant: Ningbo Geely Automobile Research & Development Co., Ltd, Ningbo (CN)

(72) Inventors: Christer Gewert, Lindome (SE); Henrik Hellekant, Göteborg (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 56 days.

(21) Appl. No.: 15/727,224

(22) Filed: Oct. 6, 2017

(65) Prior Publication Data

US 2018/0029555 A1 Feb. 1, 2018

Related U.S. Application Data

(63) Continuation of application No. PCT/EP2016/057082, filed on Mar. 31, 2016.

(30) Foreign Application Priority Data

Apr. 17, 2015 (SE) ...................................... 1550466

(51) Int. Cl.
*B60R 21/045* (2006.01)
*B65B 19/24* (2006.01)
(Continued)

(52) U.S. Cl.
CPC ............ *B60R 21/045* (2013.01); *B62D 25/14* (2013.01); *B62D 25/145* (2013.01);
(Continued)

(58) Field of Classification Search
CPC .................. B60R 21/045; B60R 21/04; B60R 2021/0051; B62D 25/145; B62D 25/14
(Continued)

(56) References Cited

U.S. PATENT DOCUMENTS 3,964,578 A * 6/1976 Campbell ............. B60R 21/045
188/377
5,096,223 A * 3/1992 Tekelly ................. B60R 21/045
280/748
(Continued)

FOREIGN PATENT DOCUMENTS

CN 202200937 4/2012
CN 102874194 1/2013
(Continued)

OTHER PUBLICATIONS

The Publication, PCT Search Report, and Written Opinion published on Oct. 20, 2016 for PCT application No. PCT/EP2016/057082, 47 pages.

*Primary Examiner* — Keith J Frisby
(74) *Attorney, Agent, or Firm* — Lee & Hayes, P.C.

(57) ABSTRACT

An energy-absorbing knee bolster frame (10) for a vehicle (1) comprises a longitudinal knee contact member (20), a first energy-absorbing transverse bracket member (30) and a second energy-absorbing transverse bracket member (40). The first energy-absorbing transverse bracket member (30) and the second energy-absorbing transverse bracket member (40) extend in a transverse direction (Y) and are spaced apart on the longitudinal knee contact member (20). The longitudinal knee contact member (20) has a knee contact surface (22) for receiving a part of a knee (80) of an occupant (P) upon a collision. The first energy-absorbing transverse bracket member (30) has a cross section defining an open profile, and is adapted at one end (32) to engage with a vehicle interior component (100), and includes a plurality of first deformation segments (34A-N) configured for absorbing energy generated by a knee impact.

20 Claims, 6 Drawing Sheets

(51) Int. Cl.
  *B62D 25/14* (2006.01)
  *B60R 21/00* (2006.01)
  *B62D 21/15* (2006.01)
(52) U.S. Cl.
  CPC .... *B65B 19/245* (2013.01); *B60R 2021/0051* (2013.01); *B62D 21/15* (2013.01)
(58) Field of Classification Search
  USPC .................................................. 280/752, 751
  See application file for complete search history.

(56) References Cited

U.S. PATENT DOCUMENTS

| | | | | |
|---|---|---|---|---|
| 5,273,314 | A * | 12/1993 | Sakakibara | B60R 21/045 188/377 |
| 5,632,507 | A | 5/1997 | Sinner et al. | |
| 6,491,322 | B1 * | 12/2002 | Ryner | B60R 21/045 280/751 |
| 7,735,865 | B2 * | 6/2010 | Cappabianca | B60R 21/045 180/90 |
| 7,997,548 | B2 * | 8/2011 | Sugiyama | B60K 20/02 248/174 |
| 8,172,264 | B2 * | 5/2012 | Mani | B60R 21/045 280/748 |
| 2003/0173763 | A1 * | 9/2003 | Yamazaki | B60R 21/045 280/748 |
| 2005/0200109 | A1 | 9/2005 | Penner et al. | |
| 2011/0148086 | A1 * | 6/2011 | DePue | B60R 21/02 280/752 |
| 2012/0068447 | A1 * | 3/2012 | An | B60R 21/045 280/752 |
| 2018/0056913 | A1 * | 3/2018 | Tani | B60R 21/045 |

FOREIGN PATENT DOCUMENTS

| | | |
|---|---|---|
| CN | 103359039 A | 10/2013 |
| DE | 19502226 C1 | 5/1996 |
| EP | 1295760 A2 | 3/2003 |
| JP | 200983739 A | 10/2010 |
| WO | WO2006011308 A1 | 2/2006 |

* cited by examiner

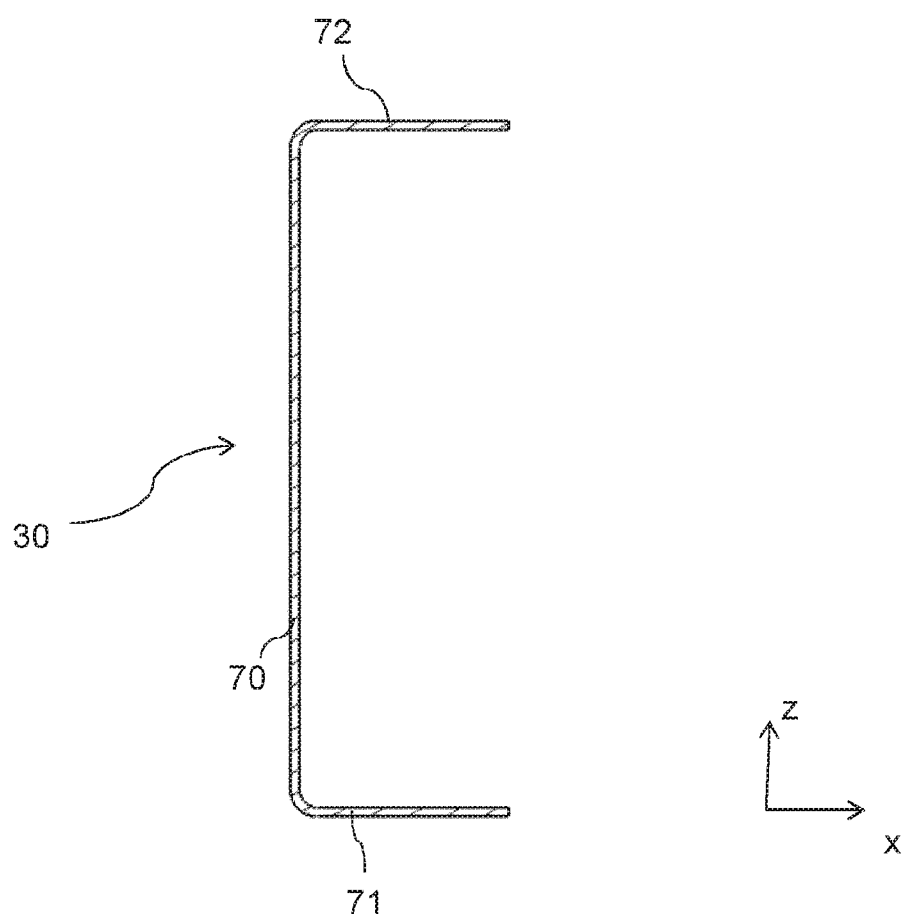
FIG.2c A-A

ENERGY-ABSORBING KNEE BOLSTER FRAME FOR A VEHICLE

RELATED APPLICATION

This application is a continuation of PCT International Application No. PCT/EP2016/057082, filed Mar. 31, 2016, which claims foreign priority to Sweden Application No. 1550466-5, filed on Apr. 17, 2015, both of which are incorporated herein by reference.

TECHNICAL FIELD

The invention relates to an energy-absorbing knee bolster frame for a vehicle. The invention also relates to an instrument panel for a vehicle, comprising an energy-absorbing knee bolster frame for a vehicle. Moreover, the invention relates to a vehicle comprising an energy-absorbing knee bolster frame for a vehicle.

The invention can be connected to an instrument panel, a cross bar member of an instrument panel or the like. Although the invention will be described in relation to a car, the invention is not restricted to this particular vehicle, but may as well be installed in other type of vehicles such as minivans, recreational vehicles, off-road vehicles, trucks, buses or the like.

BACKGROUND ART

In the field of vehicle knee bolster devices there is an increasing demand for improving the functionality of the device during a crash or traffic collision in order to mitigate the collision impacts on the knee regions of an occupant.

Typically, a vehicle knee bolster device is arranged in a passenger compartment. As an example, the vehicle knee bolster may be mounted to an instrument panel in an interior of the vehicle such as a car or the like in order to support the movement of the occupant's knee upon a crash or collision.

In other words, a knee bolster device is a type of vehicle safety device designed to reduce leg injury, or more specifically to reduce collision impacts on the knee regions. To this end, its purpose is to cushion occupants during a crash and provide support or protection to their knees when they move forwards due to the forces caused by the collision.

Some types of knee bolster devices are designed with the intention of supplementing the protection of an occupant who is correctly restrained with a seat belt, while other types of devices are designed to support an occupant who is driving without a fastened seat belt.

More recently, some types of vehicle knee bolster devices have been further adapted to absorb energy. As an example, the vehicle knee bolster device can be arranged and configured to absorb kinetic energy of the occupant's knee caused by the crash or the collision by means of one or several energy-absorbing material elements.

Accordingly, knee bolster devices for vehicles are increasingly complex as the demands on the degree of absorbing energy of such systems increase.

However, due to an increasing demand for reducing weight and size of the components making up the device, while yet providing a functional reliable energy-absorbing knee bolster device, it remains a need for an improved vehicle knee bolster device.

In addition, it would be desirable to provide a knee bolster device that can be manufactured in large scales, yet keeping the costs of manufacturing of the device to a minimum.

SUMMARY OF THE INVENTION

A general object of the present invention is to provide an improved energy-absorbing knee bolster frame for a vehicle, which is adapted to collapse in a controllable manner.

This and other objects, which will become apparent in the following, are accomplished by an energy-absorbing knee bolster frame for vehicle as defined in the accompanying independent claim. Details of some example embodiments and further optional features are recited in the associated dependent claims.

According to a first aspect of the present invention, there is provided an energy-absorbing knee bolster frame for a vehicle, comprising a longitudinal knee contact member, a first energy-absorbing transverse bracket member and a second energy-absorbing transverse bracket member. The first energy-absorbing transverse bracket member and the second energy-absorbing transverse bracket member extend in a transverse direction, respectively, and are arranged spaced apart on the longitudinal knee contact member. Further, the longitudinal knee contact member has a knee contact surface for receiving a part of a knee of an occupant upon a collision. The first energy-absorbing transverse bracket member has a cross section defining an open profile and is adapted at one end to engage with a vehicle interior component. The first energy-absorbing transverse bracket member further comprises a plurality of first deformation segments configured for absorbing energy generated by a knee impact. Moreover, each one of the deformation segments includes an opening and a corresponding pre-bent frame region arranged along a transverse length of the opening for initiating a deformation of a corresponding deformation segment in a transverse direction when said knee bolster frame is subjected to a force from the knee of the occupant upon a collision. Analogously, the second energy-absorbing transverse bracket member has a cross section defining an open profile and is adapted at one end to engage with the vehicle interior component. The second energy-absorbing transverse bracket member further comprises a plurality of second deformation segments configured for absorbing energy generated by a knee impact. Moreover, each one of the deformation segments includes an opening and a corresponding pre-bent frame region arranged along a transverse length of the opening for initiating a deformation of a corresponding deformation segment in the transverse direction when the knee bolster frame is subjected to a force from the knee of the occupant upon a collision.

In this way, it becomes possible to provide an energy-absorbing knee bolster frame configured for absorbing energy generated upon and during a collision or traffic incident by the configuration of the first energy-absorbing transverse bracket member and the second energy-absorbing transverse bracket member. The first energy-absorbing transverse bracket member and the second energy-absorbing transverse bracket member absorbs energy by means of the arrangement of the deformation segments including the opening and the corresponding pre-bent frame region. In other words, the frame is based on two parts, i.e. the first energy-absorbing transverse bracket member and the second energy-absorbing transverse bracket member, that are configured to absorb energy during deformation.

By the arrangement that the energy-absorbing transverse bracket members is arranged to the longitudinal knee contact member, having a knee contact surface for receiving a part of a knee of an occupant upon a collision, it becomes possible to direct (i.e. transfer) the forces generated from the collision to the energy-absorbing transverse bracket members in order to absorb the energy in an efficient manner.

By the provision that each one of the deformation segments includes an opening and a corresponding pre-bent frame region arranged along a transverse length of the opening, it becomes possible to initiate the deformation of a corresponding deformation segment in the transverse direction so that the deformation of the bracket members can be controlled in an improved and simple manner, typically essentially in the transverse direction. Thus, when the knee bolster frame is subjected to a force from the knee of the occupant upon a collision, the forces are transferred to the bracket members which subsequently deforms due to the opening and the pre-bent frame region.

To this end, the location of the pre-bent frame region provides a weakening region so that the corresponding opening allows for a collapse of the deformation segment essentially along the transverse direction of the deformation segment. In other words, the location of the pre-bent frame region along a transverse length of the opening contributes to that the deformation is controllable and essentially directed in the transverse extension of the frame.

Further, the configuration of having deformation segments defined by openings and pre-bent frame regions enables a plastic deformation (i.e. collapse) of the bracket members essentially in the in the transverse direction rather than an elastic deformation. Accordingly, each one of the deformation segments is configured for being plastically deformed upon a collision.

In addition, by using deformation segments defined by an opening and a pre-bent frame region, it becomes possible to allow for a simple adjustment of the deformation zone prior to an installation of the energy-absorbing knee bolster frame with respect to requirements of deformation levels of the frame for a specific type of vehicle. In other words, the energy-absorbing knee bolster frame may allow for a fine tuning of the deformation prior to installation of the frame into a vehicle in order to work efficiently for individuals of different sizes in terms of weight, length etc.

Although the energy-absorbing knee bolster frame may be installed in vehicles having seat belts, the frame according to example embodiments is particularly useful for vehicles without seat belts or in geographical regions where there are no legal jurisdictions as to driving with fastened seat belts.

In contrast to hitherto known energy-absorbing knee bolster devices typically including more complicated constructions, the frame according to example embodiments provides an inexpensive and simple knee bolster frame that is easy to manufacture, yet being flexible and possible to adapt according to requirements of the installation and the type of vehicle.

It is to be noted that the term "energy-absorbing" as used herein typically refers to an energy absorbing deformation characteristic. Thus, the example embodiments of the invention relates to an energy-absorbing kneel bolster frame for a vehicle configured for absorbing energy via deformation, the knee bolster frame including any one of the example embodiments and/or features as described herein.

Typically, the term "open profile" as used herein refers to a cross section such as U-shaped cross section, E-shaped cross section, I-shaped cross section, H-shaped cross section or the like. In other words, an open profile is to be distinguished from a cross section having a closed profile such as an annular shaped cross section.

One advantage with an open profile is that the energy-absorbing transverse bracket member can be manufactured in a simple and more cost-efficient manner in contrast to a closed profile.

For instance, the configuration of having bracket members with open profiles enables that the bracket members can be manufactured by progressive stamping or transfer stamping.

In one example embodiment, the open profile is a U-shaped profile. That is, the open profile has a first profile flange and a second profile flange extending from an intermediate member.

A U-shaped open profile provides for improved stability and robustness of the energy-absorbing transverse bracket member, which further contributes to that the deformation of the bracket member can occur in an essentially transverse direction of the knee bolster frame.

Thus, in one example embodiment, the open profile of the first energy-absorbing transverse bracket member is defined by a first profile flange and a second profile flange extending from an intermediate member and the open profile of the second energy-absorbing transverse bracket member is defined by a first profile flange and a second profile flange extending from an intermediate member. This type of configuration provides the example advantages as mentioned above with respect to the open profile in a simple manner.

The configuration of having bracket members with open profiles as mentioned above thus provides a more controlled deformation and collapse compared to other knee bolster frames with closed profiles. In an example embodiment, any one of the pre-bent frame regions is defined by a substantially convex shaped region as seen with respect to a plane defined by the transverse direction and a height direction.

In an example embodiment, each one of the plurality of the first deformation segments and the plurality of the second deformation segments may comprise deformation segments having different deformation levels.

In an example embodiment, the plurality of the first deformation segments and the plurality of the second deformation segments are configured so that the deformation levels of the plurality of the first deformation segments and the plurality of the second deformation segments increase for each following pair of deformation segments along the transverse direction, as seen from the longitudinal knee contact member.

In an example embodiment, each one of the plurality of the first deformation segments and the plurality of the second deformation segments comprises at least one adjustable deformation segment enabling an adjustment of the deformation level of the adjustable deformation segment.

Typically, although not strictly necessary, the deformation level of the at least one adjustable deformation segment is adjusted by amending the shape of the opening of the at least one adjustable deformation segment.

In an example embodiment, all deformation segments in the plurality of the first deformation segments and the plurality of the second deformation segments are adjustable deformation segments.

In an example embodiment, the energy-absorbing knee bolster frame is generally U-shaped, extending in the longitudinal direction, the transverse direction and in the height direction (direction Z).

Typically, although not strictly necessary, the energy-absorbing knee bolster frame is made of steel, such as standard steel, high strength steel or stainless steel.

In some design variants, any one of the first deformation segments comprises a pair of pre-bent frame regions arranged on opposite sides of the opening of the deformation segment and at a substantially equal distance from a transverse centre line L of said opening. In some design variants, every one of the first deformation segments comprises a pair of pre-bent frame regions arranged on opposite sides of their corresponding openings, respectively and at a substantially equal distance from a transverse centre line L of said corresponding openings.

In some design variants, any one of the second deformation segments comprises a pair of pre-bent frame regions arranged on opposite sides of the opening of the deformation segment and at a substantially equal distance from a transverse centre line L' of said opening.

In some design variants, every one of the second deformation segments comprises a pair of pre-bent frame regions arranged on opposite sides of their corresponding openings, respectively and at a substantially equal distance from a transverse centre line L of said corresponding openings.

The invention also relates to an instrument panel for a vehicle, wherein the instrument panel comprises an energy-absorbing knee bolster frame according to the aspect and/or any one of the example embodiments as mentioned above with respect to the first aspect of the invention, i.e. the aspects relating to the energy-absorbing knee bolster frame.

The invention also relates to a vehicle comprising an energy-absorbing knee bolster frame according to any one of the aspects and/or example embodiments as mentioned above with respect to the first aspect of the invention, i.e. the aspects relating to the energy-absorbing knee bolster frame.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various example embodiments of the invention, including its particular features and example advantages, will be readily understood from the following illustrative and non-limiting detailed description and the accompanying drawings, in which:

FIG. 2b is a side view of the first example embodiment of an energy-absorbing knee bolster frame according to the present invention as shown in FIG. 2a;

FIG. 2c schematically illustrates a cross sectional view of an energy-absorbing transverse bracket member of the first example embodiment of the energy-absorbing knee bolster frame as shown in FIGS. 2a and 2b.

in FIGS. 2a and 2b, in which a deformation segment of the first energy-absorbing transverse bracket has been adjusted so as to amend the deformation level of the deformation segment.

DETAILED DESCRIPTION OF EXAMPLE EMBODIMENTS OF THE INVENTION

Figure 1A:
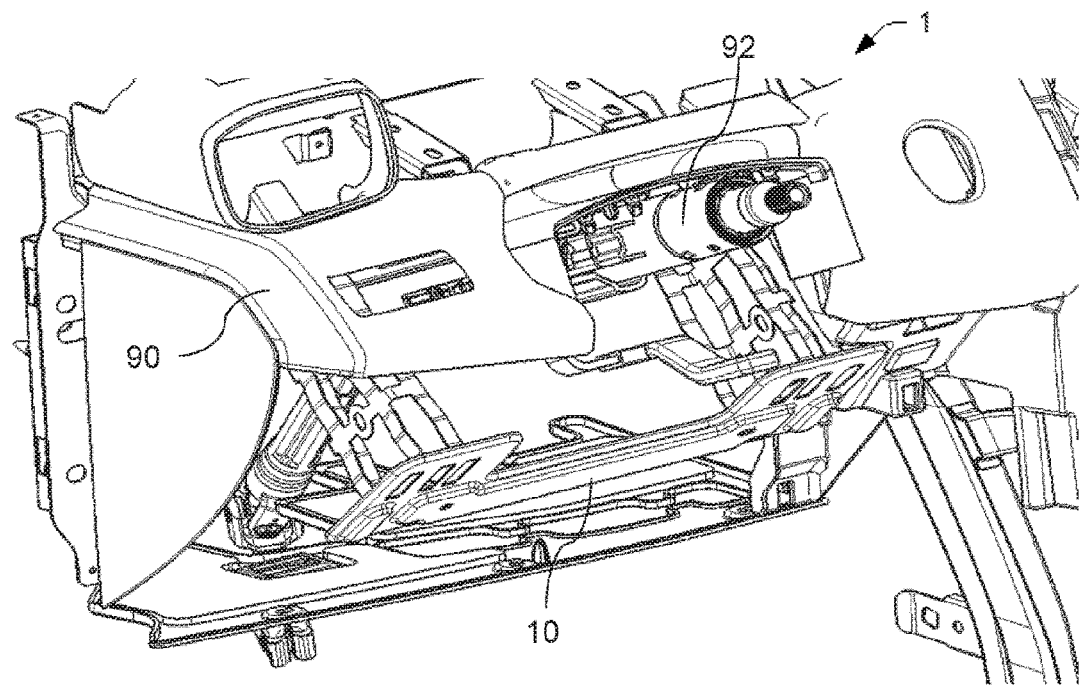
FIG. 1a is a perspective view of a first example embodiment of an energy-absorbing knee bolster frame according to the present invention, wherein the energy-absorbing knee bolster frame is connected to an instrument panel.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Figure 1B:
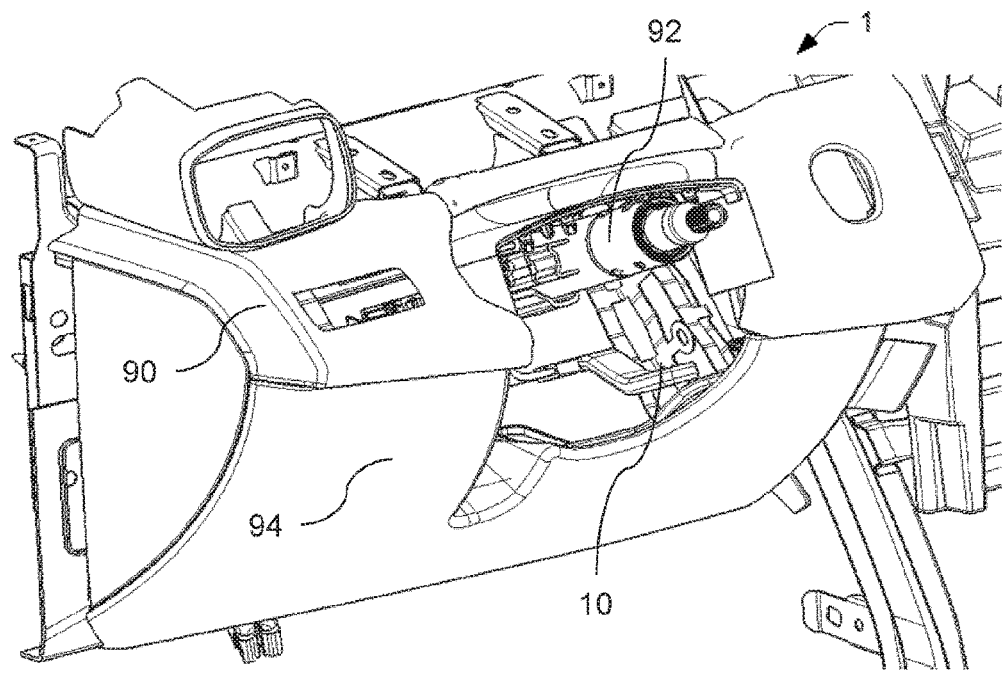
FIG. 1b is another perspective view of the first example embodiment of energy-absorbing knee bolster frame in FIG. 1a, wherein the energy-absorbing knee bolster frame is connected to an instrument panel.
Figure 1C:
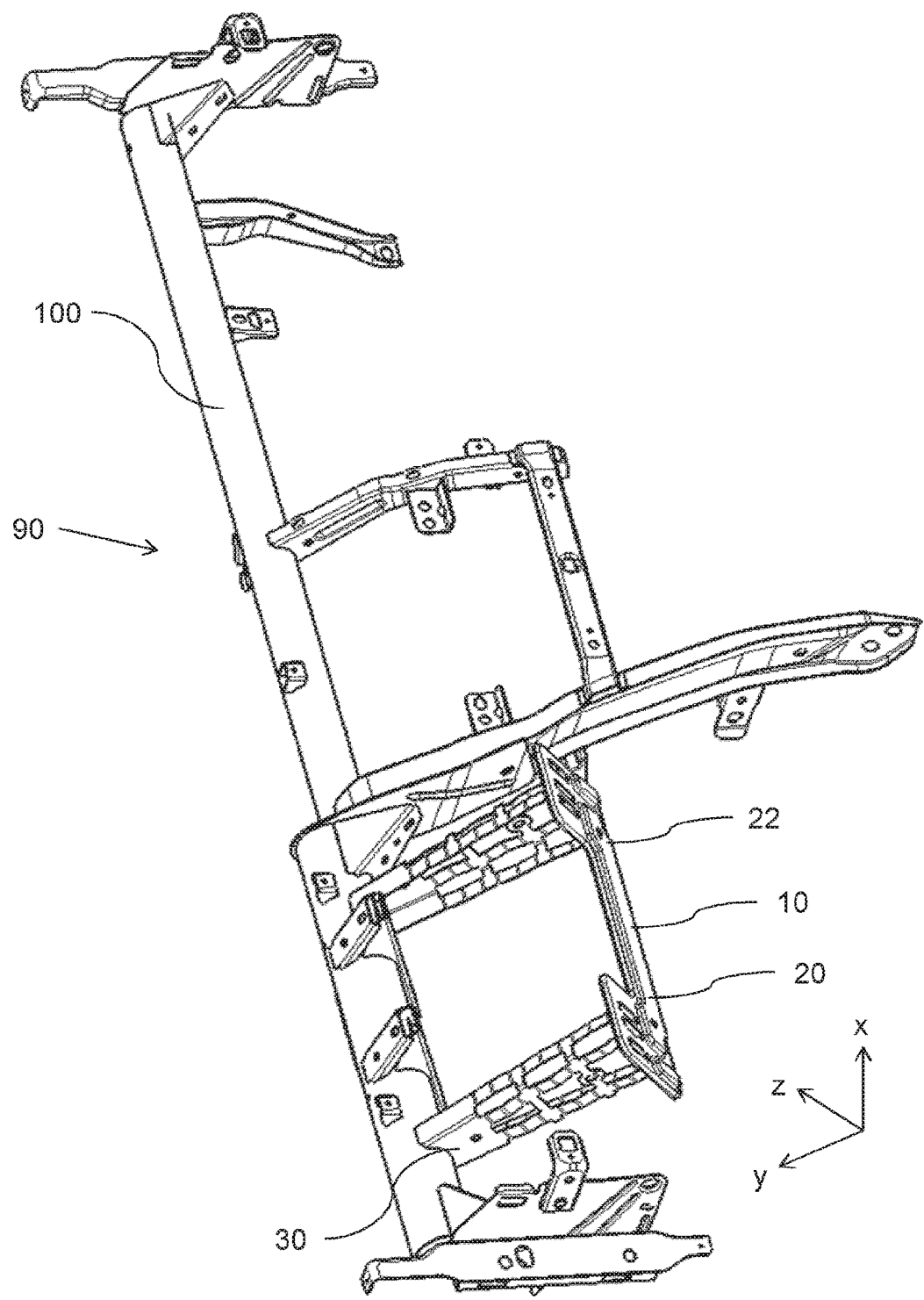
FIG. 1c is a perspective view of the first example embodiment of an energy-absorbing knee bolster frame according to the present invention, wherein the energy-absorbing knee bolster frame is connected to an instrument panel via a cross beam member of the instrument panel.

Referring now to the figures and FIGS. 1a-1c in particular, there is depicted an energy-absorbing knee bolster frame installed in vehicle. More particularly, the energy-absorbing knee bolster frame is here connected to an instrument panel 90 of the vehicle 1. Typically, although not strictly required, the energy-absorbing knee bolster frame 10 is connected to the instrument panel 90 below the steering column 92 of the vehicle 1, as shown in FIG. 1a. Accordingly, the instrument panel 90 is provided with an energy-absorbing knee bolster frame according to an example embodiment, as described hereinafter. The vehicle 1 (not entirely shown) thus includes the instrument panel 90, which is provided with the energy-absorbing knee bolster frame 10. The energy-absorbing knee bolster frame 10 is described in further detail below with reference to FIGS. 1a-1c, FIGS. 2a-2c, FIGS. 3a-3b and FIGS. 4a-4c.

The vehicle 1 is provided in the form of a car. Moreover, the instrument panel 90 is arranged in a vehicle compartment of the car. The arrangement, components and functions of the instrument panel (sometimes denoted as the dashboard) are well-known in the art, and therefore not further described herein. In addition, it should be readily appreciated that an instrument panel (sometimes denoted as a dashboard) is only one example of a suitable installation of the energy-absorbing knee bolster frame 10. In some example embodiments, not shown, it may, however, be possible that the energy-absorbing knee bolster frame can be installed and arranged in other vehicle compartment members.

In addition, the energy-absorbing knee bolster frame can be arranged and installed in any type of vehicle such as a minivan, recreational vehicle, off-road vehicle, truck, bus or the like.

Figure 2A:
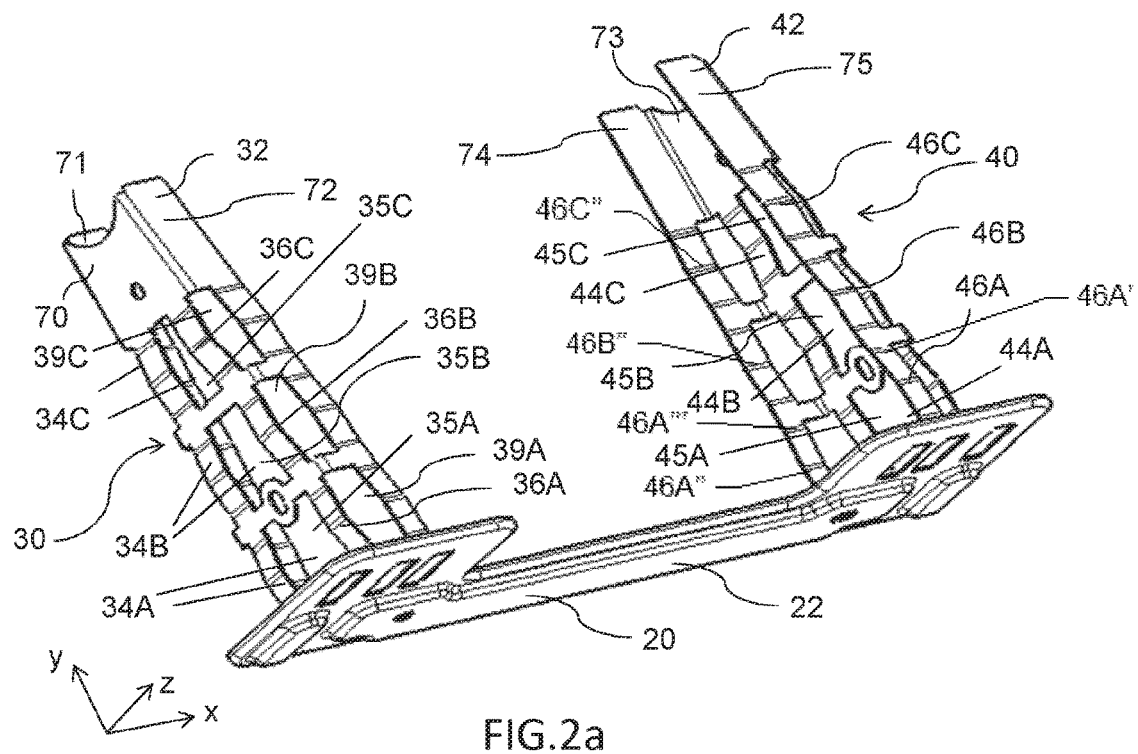
FIG. 2a schematically illustrates a more detailed view of the first example embodiment of an energy-absorbing knee bolster frame according to the present invention.

Turning now to FIGS. 1a-1c and FIG. 2a, an example embodiment of the energy-absorbing knee bolster frame of a vehicle is illustrated. FIGS. 1a to 1c are perspective views of the example embodiment of the energy-absorbing knee bolster frame according to the present invention, while FIG. 2a schematically illustrates further details of the energy-absorbing knee bolster frame according to one example embodiment.

As mentioned above, the example embodiment of the energy-absorbing knee bolster frame as shown in FIGS. 1a-1b is connected to the instrument panel 90. FIG. 1b further shows that a cover 94 may be arranged to the instrument panel in order to visually cover the energy-absorbing knee bolster frame 10, while FIG. 1c shows that the energy-absorbing knee bolster frame may be arranged to a cross bar member 100 of the instrument panel 90. However, it should be readily appreciated that this type of installation of the energy-absorbing knee bolster frame 10 to the cross bar member 100 is only one of several different possibilities on an installation of the frame 10 to the instrument panel 90.

With particular reference to FIG. 2a, there is depicted a more detailed view of the example embodiment of the energy-absorbing knee bolster frame 10 for a vehicle as shown in FIGS. 1a-1c. The energy-absorbing knee bolster frame is generally U-shaped. In addition, the energy-absorbing knee bolster frame typically extends in a longitudinal direction X, a transverse direction Y and in a height direction (herein also referred to as the direction Z).

In other words, the energy-absorbing knee bolster frame here is generally U-shaped, extending in the longitudinal direction X, the transverse direction Y and in the height direction Z (direction Z). It should be readily appreciated that the energy-absorbing knee bolster frame may be installed with an inclination to a horizontal plane of the vehicle. However, in some example embodiments, the energy-absorbing knee bolster frame may be installed in an essentially horizontal arrangement so that the transverse direction of the frame 10 is essentially parallel to the horizontal plane of the vehicle. The ultimate installation and arrangement of the frame 10 in a vehicle typically depends on the type of vehicle etc., thus several different installation modes are conceivable.

As shown in FIG. 2a, the energy-absorbing knee bolster frame 10 comprises a longitudinal knee contact member 20, a first energy-absorbing transverse bracket member 30 and a second energy-absorbing transverse bracket member 40. Further, the first energy-absorbing transverse bracket member 30 and the second energy-absorbing transverse bracket member 40 extend in the transverse direction Y, respectively, and arranged spaced apart on the longitudinal knee contact member 20.

It is to be noted that the longitudinal knee contact member 20 typically extends in the longitudinal direction X and in the height direction Z, and further has thickness in the transverse direction Y. In addition, the first energy-absorbing transverse bracket member 30 typically extends in the longitudinal direction X, the transverse direction Y and in the height direction Z (direction Z). Analogously, the second energy-absorbing transverse bracket member 40 also here extends in the longitudinal direction X, the transverse direction Y and in the height direction Z (direction Z).

Although not strictly required, the first energy-absorbing transverse bracket member 30 and the second energy-absorbing transverse bracket member 40 are typically arranged spaced apart on the longitudinal knee contact member 20 and at the outer regions of the knee contact member 20, respectively, as shown in FIGS. 1a-1c and FIG. 2a. Hereby, it is believed that the stability of the frame 10 may be further improved. It is to be noted that the first energy-absorbing transverse bracket member 30 and the second energy-absorbing transverse bracket member 40 are arranged spaced apart along the longitudinal direction X of the longitudinal knee contact member 20, as shown in the Figures.

Moreover, the longitudinal knee contact member 20 has a knee contact surface 22 for receiving a part of a knee 80 of an occupant P upon a collision. As shown in FIG. 2a, the knee contact surface of the knee contact member should be facing the occupant. Hence, the knee contact surface 22 is here the outer surface of the knee contact member 20, as seen when the frame 10 is connected to the instrument panel 90.

The first energy-absorbing transverse bracket member 30 has a cross section defining an open profile, which is illustrated in e.g. FIG. 2c. In other words, the first energy-absorbing transverse bracket member 30 has a cross section defining an open profile as seen in the longitudinal direction X and in the direction Z. As an example, the transverse bracket member 30 here has a U-shaped cross section. In other words, the first energy-absorbing transverse bracket member 30 has a U-shaped cross section defining an open profile as seen in the longitudinal direction X and in the direction Z. By way of example, as shown in FIG. 2c, the open profile of the first energy-absorbing transverse bracket member 30 is here defined by a first profile flange 71 and a second profile flange 72 extending from an intermediate member 70.

Also, the first energy-absorbing transverse bracket member 30 is adapted at one end 32 to engage with a vehicle interior component 100. As mentioned above, the vehicle interior component may for instance be a cross bar member 100 of an instrument panel 90. Alternatively, the vehicle interior component may refer to the instrument panel itself.

The first energy-absorbing transverse bracket member 30 further comprises a plurality of first deformation segments 34A-N configured for absorbing energy generated by a knee impact. As shown in e.g. FIG. 2a, and also in FIG. 2b, each one of the deformation segments 34A-N includes an opening 35A-N and a corresponding pre-bent frame region 36A-N arranged along a transverse length of the opening for initiating a deformation of a corresponding deformation segment in a transverse direction Y when the knee bolster frame 10 is subjected to a force from the knee 80 of the occupant P upon a collision.

Figure 3A:
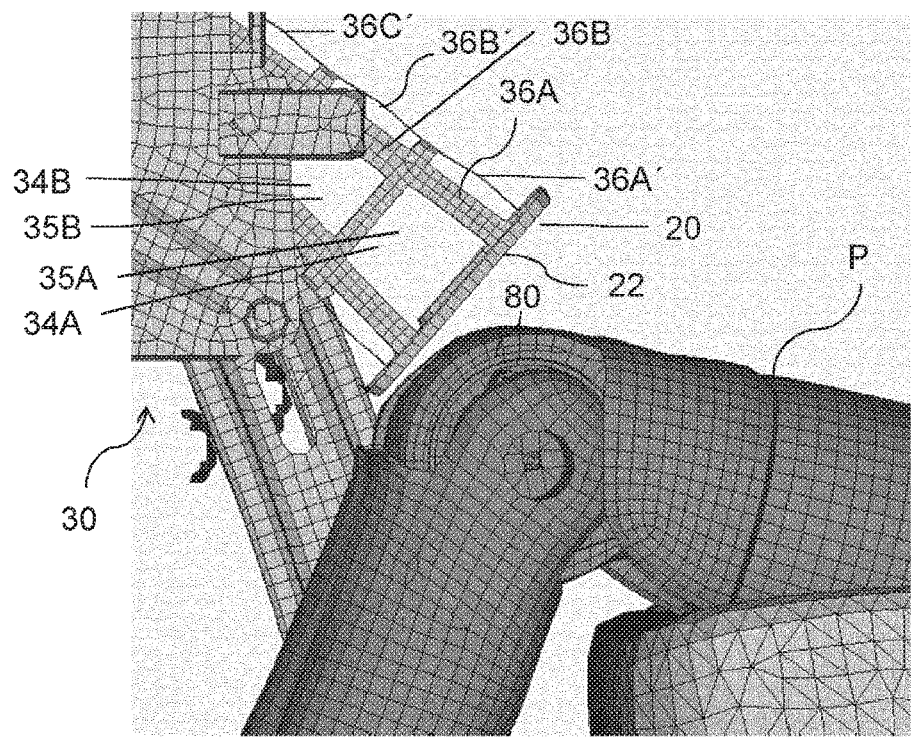
FIG. 3a illustrates the first example embodiment of the energy-absorbing knee bolster frame in an operational state prior to a collision.
Figure 3B:
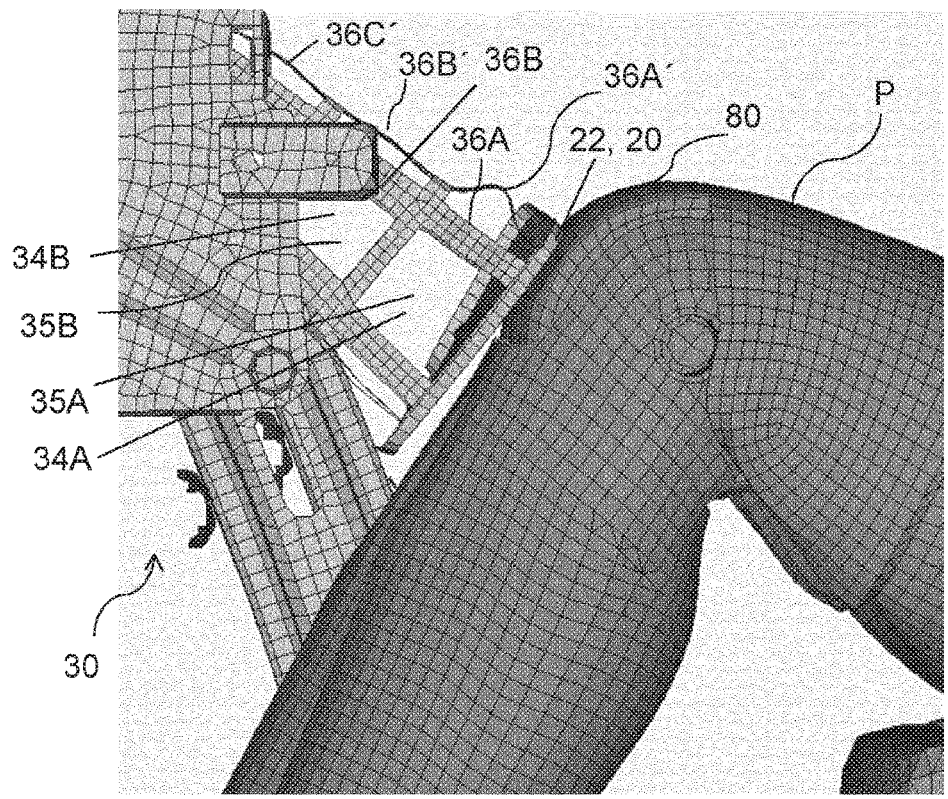
FIG. 3b illustrates the first example embodiment of the energy-absorbing knee bolster frame in an operational state upon a collision, in which the energy-absorbing knee bolster frame is partly deformed due to the forces generated during the collision causing a knee of an occupant to move in the transverse direction of the energy-absorbing knee bolster frame.

Accordingly, the each deformation segment of the plurality of the first deformation segments is configured for absorbing energy by means of an opening and a corresponding pre-bent frame region arranged along a transverse length of the opening, which may also be gleaned from FIG. 3b.

The first energy-absorbing transverse bracket member 30 may typically be adapted at one end 32 to engage with the vehicle interior component 100, such as a cross bar member of an instrument panel 90, by means of screws or welding.

Optional, although not strictly required, each one of the deformation segments 34A-N may include additional openings 39A-N and corresponding pre-bent frame regions 36A'-N' arranged along a transverse length of the opening for initiating a deformation of a corresponding deformation segment in a transverse direction Y when the knee bolster frame 10 is subjected to a force from the knee 80 of the occupant P upon a collision. Further to be noted, the configuration and amount of openings and pre-bent region for each deformation segment may vary depending on the situation, the purpose and the function of the energy-absorbing transverse bracket member. As shown in the figures, in one example embodiment, each deformation segment here comprises a set of three openings.

As mentioned above, each one of the deformation segments 34A-N includes an opening 35A-N and a corresponding pre-bent frame region 36A-N arranged along the transverse length of the opening for initiating a deformation of a corresponding deformation segment in the transverse direction. In an example when a deformation segment, e.g. deformation segment 34A, comprises a number of pre-bent frame regions 36A, 36N'-36A''', as shown in e.g. FIG. 2b, it should also be readily appreciated that a pair of pre-bent frame regions 36A and 36A" can be arranged on opposite sides of the opening 34A in order to further contribute to a deformation of the deformation segment essentially along the transverse direction Y. In one example embodiment, the pair of the pre-bent frame regions 36A and 36A" are arranged at a substantially equal distance from a transverse centre line L and on opposite sides of the opening 34A. By this arrangement of the pre-bent frame regions, the deformation of the deformation segment along the transverse direction Y can be controlled in an efficient, yet simple manner.

It should be readily appreciated that the above arrangement of the pair of pre-bent frame regions being arranged on opposite sides of the opening is also applicable to any one of the other deformation segments of the 34A-36N. Analogously, the arrangement of the pair of the pre-bent frame regions being arranged at a substantially equal distance from the transverse centre line L and on opposite sides of the opening is also applicable to any one of the other deformation segments of the 34A-36N.

Analogously, as shown in e.g. FIG. 2c, the second energy-absorbing transverse bracket member 40 here has a cross section defining an open profile. In other words, the second energy-absorbing transverse bracket member 40 has a cross section defining an open profile as seen in the longitudinal direction X and in the direction Z. As an example, the second transverse bracket member 40 here has a U-shaped cross section. In other words, the second energy-absorbing transverse bracket member 40 has a U-shaped cross section defining an open profile as seen in the longitudinal direction X and in the direction Z. By way of example, the open profile of the second energy-absorbing transverse bracket member 40 is defined by a first profile flange 74 and a second profile flange 75 extending from an intermediate member 73.

Also, the second energy-absorbing transverse bracket member 40 is adapted at one end 42 to engage with the vehicle interior component 100. The second energy-absorbing transverse bracket member 40 further comprises a plurality of second deformation segments 44A-N configured for absorbing energy generated by the knee impact. As shown in e.g. FIG. 2a, and also in FIG. 2b, each one of the deformation segments 44A-N includes an opening 45A-N and a corresponding pre-bent frame region 46A-N arranged along a transverse length of the opening for initiating a deformation of a corresponding deformation segment in the transverse direction Y when the knee bolster frame 10 is subjected to a force from the knee 80 of the occupant P upon a collision.

Accordingly, the each deformation segment of the plurality of the second deformation segments is configured for absorbing energy by means of an opening and a corresponding pre-bent frame region arranged along a transverse length of the opening.

The second energy-absorbing transverse bracket member 40 may typically be adapted at one end 42 to engage with the vehicle interior component 100, such as a cross bar member of an instrument panel 90, by means of screws or welding.

Optional, although not strictly required, each one of the deformation segments 44A-N may include additional openings 49A-N and corresponding pre-bent frame regions 46A'-N' arranged along a transverse length of the opening for initiating a deformation of a corresponding deformation segment in a transverse direction Y when the knee bolster frame 10 is subjected to a force from the knee 80 of the occupant P upon a collision. Further to be noted, the configuration and amount of openings and pre-bent region for each deformation segment may vary depending on the situation, the purpose and the function of the energy-absorbing transverse bracket member.

As mentioned above, each one of the deformation segments 44A-N includes an opening 45A-N and a corresponding pre-bent frame region 46A-N arranged along the transverse length of the opening for initiating a deformation of a corresponding deformation segment in the transverse direction. In one example, when a deformation segment, e.g. deformation segment 44A, comprises a number of pre-bent frame regions 46A, 46A'-46A''', it should also be readily appreciated that a pair of pre-bent frame regions 46A and 46A" are arranged on opposite sides of the opening 44A in order to further contribute to a deformation of the deformation segment essentially along the transverse direction Y. In one example embodiment, the pair of the pre-bent frame regions 46A and 46A" are arranged at a substantially equal distance from a transverse centre line L' and on opposite sides of the opening 44A. By this arrangement of the pre-bent frame regions, the deformation of the deformation segment along the transverse direction Y can be controlled in an efficient, yet simple manner.

It should be readily appreciated that the above arrangement of the pair of pre-bent frame regions being arranged on opposite sides of the opening is also applicable to any one of the other deformation segments of the 44A-46N. Analogously, the arrangement of the pair of the pre-bent frame regions being arranged at a substantially equal distance from the transverse centre line L' and on opposite sides of the opening is also applicable to any one of the other deformation segments of the 44A-46N.

Figure 2B:
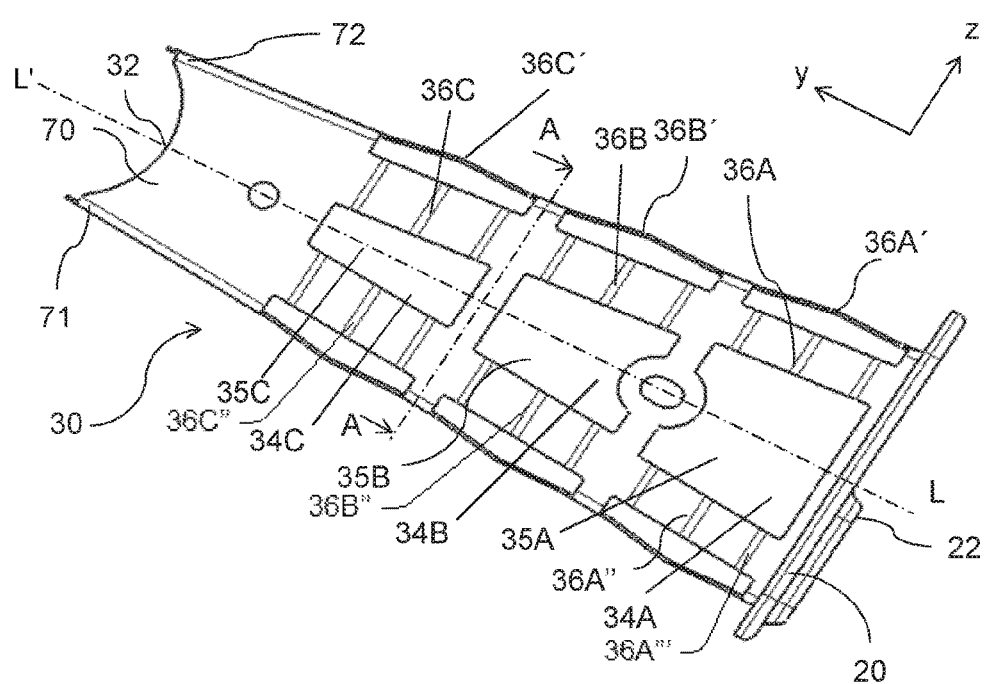

Moreover, it is also conceivable, although not strictly required, that each deformation segment comprises a plurality of pre-bent frame regions arranged along the transverse length of the opening. Accordingly, each deformation segment may comprise a plurality of pre-bent frame regions arranged along the transverse length on one side of the opening and another plurality of pre-bent frame regions arranged along the transverse length on the opposite side of the transverse centre line of the opening. Merely as an example, the design variant as shown in FIGS. 2a-2c, comprises three pre-bent regions on each side of the opening 35A. That is, the number of the pre-bent frame regions arranged on each side of the opening 35A is three; however, the number of pre-bent frame regions may vary depending on the desired level of deformation of each deformation segment. Thus, in some design variants, it is sufficient that only one pre-bent region is arranged along the transverse length of an opening.

It should be readily appreciated that a collision may refer to a traffic collision, also known as a motor vehicle collision, traffic accident, motor vehicle accident, car accident, automobile accident, road traffic collision, road traffic accident, wreck, car crash, or car smash. A collision typically occurs when a vehicle collides with another vehicle, pedestrian, animal, road debris, or other stationary obstruction, such as a tree or utility pole.

A number of factors contribute to the risk of collision, including vehicle design, speed of operation, road design, road environment, driver skill and/or impairment, and driver behaviour.

The example embodiment of the invention provides an energy-absorbing knee bolster frame 10 capable of mitigating the impacts from a collision by a deformation of any one of the first deformable transverse bracket member 30 and the second deformable transverse bracket member 40, i.e. to absorb energy generated due to the collision via deformation. It should be readily appreciated that energy herein refers to the kinetic energy from the movement of the occupant due to a e.g. a collision. In this way, it becomes possible to provide an energy-absorbing knee bolster frame configured for absorbing energy generated upon and during a collision or traffic incident by the configuration of the first energy-absorbing transverse bracket member and the second energy-absorbing transverse bracket member. The first energy-absorbing transverse bracket member and the second energy-absorbing transverse bracket member absorbs energy by means of the arrangement of the deformation segments including the opening and the corresponding pre-bent frame region. In other words, the frame is based on two parts, i.e. the first energy-absorbing transverse bracket member and the second energy-absorbing transverse bracket member, that are configured to absorb energy during deformation.

By the arrangement that the energy-absorbing transverse bracket members 20 and 30 are arranged to the longitudinal knee contact member 20, having a knee contact surface 22 for receiving a part of a knee of an occupant upon a collision, it becomes possible to direct (i.e. transfer) the forces generated from the collision via the longitudinal knee contact member 20 to the energy-absorbing transverse bracket members 20 and 30 in order to absorb the energy in an efficient manner.

By the provision that each one of the deformation segments includes an opening and a corresponding pre-bent frame region arranged along a transverse length of the opening, it becomes possible to initiate the deformation of a corresponding deformation segment in the transverse direction so that the deformation of the bracket members can be controlled in an improved and simple manner, typically essentially in the transverse direction. Thus, when the knee bolster frame is subjected to a force from the knee of the occupant upon a collision, the forces are transferred to the bracket members 20 and 30 which subsequently deforms due to the opening(s) and the pre-bent frame region(s).

To this end, the location of the pre-bent frame region provides a weakening region so that the corresponding opening allows for a collapse of the deformation segment essentially along the transverse direction of the deformation segment. In other words, the location of the pre-bent frame region along a transverse length of the opening contributes to that the deformation is controllable and essentially directed in the transverse extension of the frame. The configuration of having deformation segments defined by openings and pre-bent frame regions enables a plastic deformation (i.e. collapse) of the bracket members essentially in the in the transverse direction rather than an elastic deformation. Accordingly, each one of the deformation segments is configured for being plastically deformed upon a collision.

In addition, by using deformation segments defined by an opening and a pre-bent frame region, it becomes possible to allow for a simple adjustment of the deformation zone prior to an installation of the energy-absorbing knee bolster frame with respect to requirements of deformation levels of the frame for a specific type of vehicle. In other words, the energy-absorbing knee bolster frame may allow for a fine tuning of the deformation prior to installation of the frame into a vehicle in order to work efficiently for individuals of different sizes in terms of weight, length etc.

In this example, as mentioned above and illustrated in e.g. FIGS. 1c, 2a-2c, each one of the first deformable transverse bracket member 30 and the second deformable transverse bracket member 40 has an open profile in the form of a U-shaped profile. That is, the open profile of the first deformable transverse bracket member 30 has a first profile flange 71 and a second profile flange 72 extending from an intermediate member 70. Typically, the first profile flange 71 and the second profile flange 72 extends from the intermediate member 70 essentially in the longitudinal direction X. Analogously, the open profile of the second deformable transverse bracket member 40 has a first profile flange 74 and a second profile flange 75 extending from an intermediate member 73. Typically, the first profile flange 74 and the second profile flange 75 extends from the intermediate member 73 essentially in the longitudinal direction X. A U-shaped profile of the transverse bracket member provides for improved stability and robustness of the energy-absorbing transverse bracket member, which contributes to that the deformation of the bracket member can occur essentially in the transverse direction Y of the knee bolster frame 10.

Although not shown in the figures, it should be readily appreciated that other open profiles may also be defined by the profile flanges and the intermediate member, e.g. an I-shaped open profile, H-shaped open profile, E-shaped open profile etc. With regards to e.g. the E-shaped open profile, this type of open profile is defined by three profile flanges and an intermediate member, in which the three profile flanges extend from the intermediate member.

Typically, although not strictly required, the pre-bent frame regions 36A-N, 46A-N are each defined by a substantially convex shaped region as seen with respect to a plane defined by the transverse direction Y and the direction Z, which is illustrated e.g. in FIG. 2b. The pre-bent region may be obtained in manufacturing of the bracket member by bending a part of the bracket member. However, it is conceivable that the pre-bent frame region may be obtained by any other suitable process available to the skilled person.

The pre-bent frame region here forms a weakening region. That is, the pre-bent frame region is designed and arranged to form a fragile region of the bracket member configured to initiate the collapse of the deformation segment of the bracket member. The design, dimension and strength of the pre-bent frame region may be adapted according to the purpose and functionality of the knee bolster frame as conceivable to the skilled person.

In addition, or alternatively (although not explicitly not shown in the Figures), a pre-bent frame region may be defined by a substantially convex shaped region as seen with respect to a plane defined by the longitudinal direction X and the transverse direction Y.

Accordingly, as shown in FIGS. 2a and 2b, the first energy-absorbing transverse bracket member 30 further comprises a plurality of first deformation segments 34A-N in the form of a first deformation segment 34A, a second deformation segment 34B and a third deformation segment 34C arranged along the transverse direction Y of the first transverse bracket member 30. Each one of the deformation segments is configured for absorbing energy generated by a knee impact, as described above.

As shown in e.g. FIG. 2a, and also in FIG. 2b, each one of the deformation segments 34A-N further includes an opening 35A-N and a corresponding pre-bent region 36A-N arranged along a transverse length of the opening for initiating a deformation of a corresponding deformation segment in a transverse direction Y when the knee bolster frame 10 is subjected to a force from the knee 80 of the occupant P upon a collision. Accordingly, the first deformation segment 34A further includes an opening 35A and a corresponding pre-bent region 36A arranged along a transverse length of the opening 35A for initiating a deformation of the first deformation segment 34A in the transverse direction Y when the knee bolster frame 10 is subjected to a force from the knee 80 of the occupant P upon a collision.

As mentioned above, in some design variants, the deformation segment 34A here comprises a pair of pre-bent frame regions 36A and 36A" arranged on opposite sides of the opening 34A. Typically, although not strictly necessary, the pair of the pre-bent frame regions 36A and 36A" are arranged at substantially equal distances from the transverse centre line L and on opposite sides of the opening 34A.

Analogously, the second deformation segment 34B further includes an opening 35B and a corresponding pre-bent region 36B arranged along a transverse length of the opening 35B for initiating a deformation of the second deformation segment 34B in the transverse direction Y when the knee bolster frame 10 is subjected to a force from the knee 80 of the occupant P upon a collision. As mentioned above, in some design variants, the deformation segment 34B here comprises a pair of pre-bent frame regions 36B and 36B" arranged on opposite sides of the opening 34B. Typically, although not strictly necessary, the pair of the pre-bent frame regions 36B and 36B" are arranged at substantially equal distances from the transverse centre line L and on opposite sides of the opening 34B.

Analogously, the third deformation segment 34C further includes an opening 35C and a corresponding pre-bent region 36C arranged along a transverse length of the opening 35C for initiating a deformation of the third deformation segment 34C in the transverse direction Y when the knee bolster frame 10 is subjected to a force from the knee 80 of the occupant P upon a collision. As mentioned above, in some design variants, the deformation segment 34C here comprises a pair of pre-bent frame regions 36C and 36C" arranged on opposite sides of the opening 34C. Typically, although not strictly necessary, the pair of the pre-bent frame regions 36C and 36C" are arranged at substantially equal distances from the transverse centre line L and on opposite sides of the opening 34C.

It should also be readily appreciated that although the example embodiment herein is illustrated by transverse bracket members including three deformation segments, respectively, the energy-absorbing knee bolster frame may be provided with transverse bracket members including two deformation segments, respectively.

Similar to the configuration of the first energy-absorbing transverse bracket member 30, the second energy-absorbing transverse bracket member 40 further comprises a plurality of second deformation segments 44A-N in the form of a first deformation segment 44A, a second deformation segment 44B and a third deformation segment 44C arranged along the transverse direction Y of the second transverse bracket member 40. Each one of the deformation segments is configured for absorbing energy generated by a knee impact.

As shown in e.g. FIG. 2a, and also in FIG. 2b, each one of the deformation segments 44A-N further includes an opening 45A-N and a corresponding pre-bent region 46A-N arranged along a transverse length of the opening for initiating a deformation of a corresponding deformation segment in the transverse direction Y when the knee bolster frame 10 is subjected to a force from the knee 80 of the occupant P upon a collision. Accordingly, the first deformation segment 44A further includes an opening 45A and a corresponding pre-bent region 46A arranged along a transverse length of the opening 45A for initiating a deformation of the first deformation segment 44A in the transverse direction Y when the knee bolster frame 10 is subjected to a force from the knee 80 of the occupant P upon a collision. As mentioned above, in some design variants, the deformation segment 44A here comprises a pair of pre-bent frame regions 46A and 46A" arranged on opposite sides of the opening 44A. Typically, although not strictly necessary, the pair of the pre-bent frame regions 46A and 46A" are arranged at substantially equal distances from the transverse centre line L' and on opposite sides of the opening 44A.

Analogously, the second deformation segment 44B further includes an opening 45B and a corresponding pre-bent region 46B arranged along a transverse length of the opening 45B for initiating a deformation of the second deformation segment 44B in the transverse direction Y when the knee bolster frame 10 is subjected to a force from the knee 80 of the occupant P upon a collision. As mentioned above, in some design variants, the deformation segment 44B here comprises a pair of pre-bent frame regions 46B and 46B" arranged on opposite sides of the opening 44B. Typically, although not strictly necessary, the pair of the pre-bent frame regions 46B and 46B" are arranged at substantially equal distances from the transverse centre line L' and on opposite sides of the opening 44B.

Analogously, the third deformation segment 44C further includes an opening 45C and a corresponding pre-bent region 46C arranged along a transverse length of the opening 45C for initiating a deformation of the third deformation segment 44C in the transverse direction Y when the knee bolster frame 10 is subjected to a force from the knee 80 of the occupant P upon a collision. As mentioned above, in some design variants, the deformation segment 44C here comprises a pair of pre-bent frame regions 46C and 46C" arranged on opposite sides of the opening 44C. Typically, although not strictly necessary, the pair of the pre-bent frame regions 46C and 46C" are arranged at substantially equal distances from the transverse centre line L' and on opposite sides of the opening 44C.

As described above in relation to FIGS. 2a and 2b, any one of the pre-bent frame regions 36A-N and 46A-N may thus be defined by a substantially convex shaped region as seen with respect to a plane defined by the transverse direction Y and the direction Z (corresponding to height direction Z of the energy-absorbing knee bolster frame 10).

In addition, or alternatively, as shown in FIGS. 1a and 2b, a pre-bent frame region 36A'-36C' or 46A'-46C' may be defined by a substantially convex shaped region as seen with respect to a plane defined by the longitudinal direction X and in the transverse direction Y.

Accordingly, each one of the deformation segments 34A-N may further include an opening 35A-N and a plurality of corresponding pre-bent regions 36A-N and 36A'-N' arranged along a transverse length of the opening for initiating a deformation of a corresponding deformation segment in the transverse direction Y when the knee bolster frame 10 is subjected to a force from the knee 80 of the occupant P upon a collision.

Analogously, each one of the deformation segments 44A-N may further include an opening 45A-N and a plurality of corresponding pre-bent regions 46A-N and 46A'-N' arranged along a transverse length of the opening for initiating a deformation of a corresponding deformation segment in the transverse direction Y when the knee bolster frame 10 is subjected to a force from the knee 80 of the occupant P upon a collision.

Typically, although not strictly necessary, each one of the plurality of the first deformation segments and the plurality of the second deformation segments comprises deformation segments having different deformation levels. It should be readily appreciated that a deformation level is here determined by the size and shape of the opening in combination with the dimensions and the characteristics of the pre-bent region.

By having deformation segments of different deformation levels, it becomes possible to adapt the deformation and energy-absorbing characteristic of the knee bolster frame according to wishes and in view of individuals of different sizes in terms of weight, length etc.

Thus, in the example embodiment as shown in FIGS. 1a-1c and 2a-2c, the first energy-absorbing transverse bracket member 30 here includes a plurality of first deformation segments comprising a first deformation segment 34A with a first deformation level, a second deformation segment 34B with a second deformation level, and a third deformation segment 34C with a third deformation level. To this end, the first deformation level of the first deformation segment 34A is defined by a certain dimension of the opening 35A and the pre-bent frame region 36A, the second deformation level of the second deformation segment 34B is defined by a certain dimension of the opening 35B and the pre-bent frame region 36B and the third deformation level of the third deformation segment 34C is defined by a certain dimension of the opening 35C and the pre-bent frame region 36C.

The level of deformation of the plurality of the first deformation segments typically increases along the transverse direction in a direction away from the longitudinal knee contact member 20. Thus, as may be gleaned from the Figures, the dimension of the first opening is smaller than the dimension of the second opening, while the dimension of the second opening is smaller than the dimension of the third opening. The dimension may here typically refer to the size of the opening.

Analogously, the second energy-absorbing transverse bracket member 40 here includes a plurality of second deformation segments comprising a first deformation segment 44A with a first deformation level, a second deformation segment 44B with a second deformation level, and a third deformation segment 44C with a third deformation level. To this end, the first deformation level of the first deformation segment 44A is defined by a certain dimension of the opening 45A and the pre-bent frame region 46A, the second deformation level of the second deformation segment 44B is defined by a certain dimension of the opening 45B and the pre-bent frame region 46B and the third deformation level of the third deformation segment 44C is defined by a certain dimension of the opening 45C and the pre-bent frame region 46C.

The level of deformation of the plurality of the second deformation segments typically increases along the transverse direction in a direction away from the longitudinal knee contact member 20. Thus, as may be gleaned from the Figures, the dimension of the first opening is smaller than the dimension of the second opening, while the dimension of the second opening is smaller than the dimension of the third opening. The dimension may here typically refer to the size of the opening.

Thus, the plurality of the first deformation segments and the plurality of the second deformation segments are configured so that the deformation levels of the plurality of the first deformation segments and the plurality of the second deformation segments increase for each following pair of deformation segments along the transverse direction, as seen from the longitudinal knee contact member 20.

In this context, the term "each following pair" refers to corresponding deformation segments of the plurality of first the deformation segments and the plurality of the second deformation segments. Hence, one following pair is defined by the first deformation segment 34A and the first deformation segment 44A. Another following pair is defined by the second deformation segment 34B and the second deformation segment 44B. In addition, yet another following pair is defined by the third deformation segment 34C and the third deformation segment 44C.

Figure 4A:
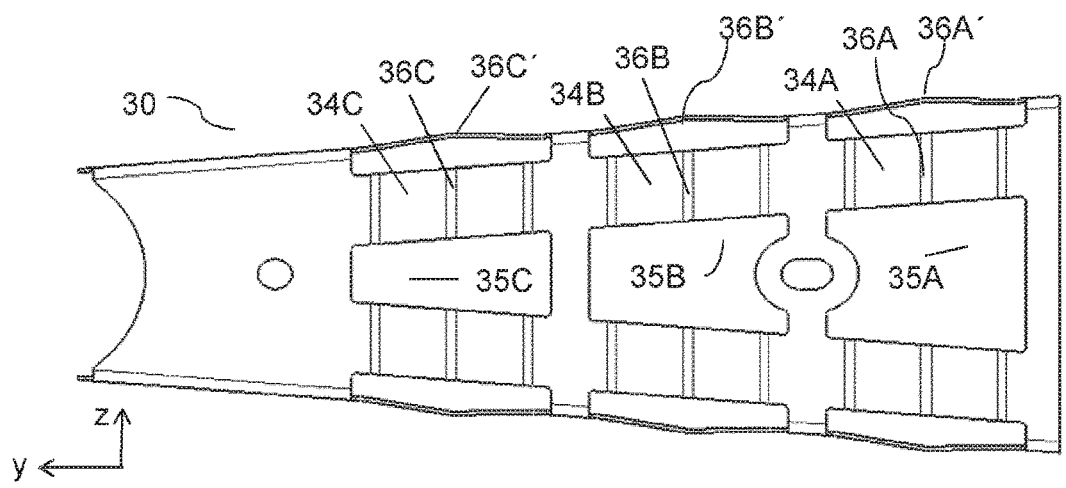
FIGS. 4a to 4c are side views of an example embodiment of an energy-absorbing knee bolster frame according to the present invention as shown e.g.
Figure 4B:
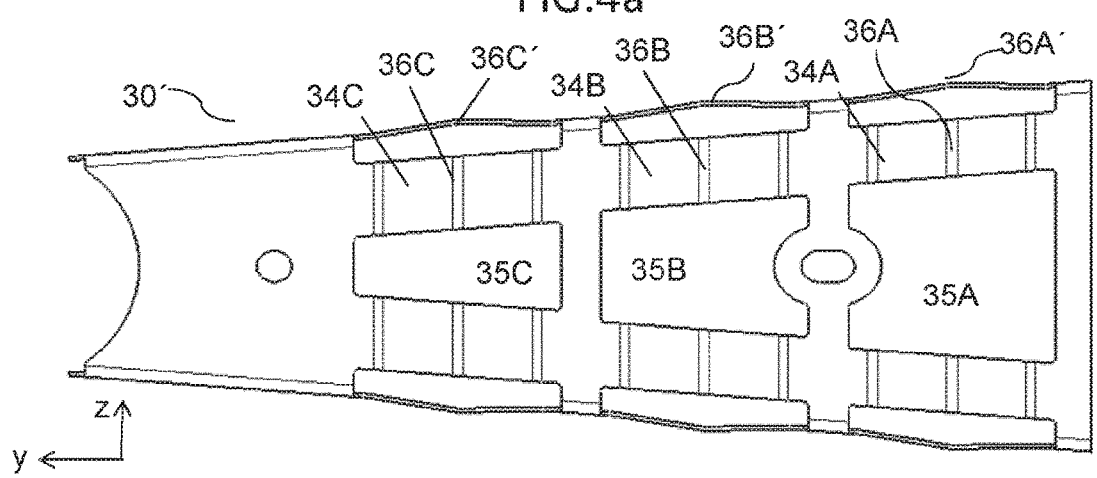
Figure 4C:
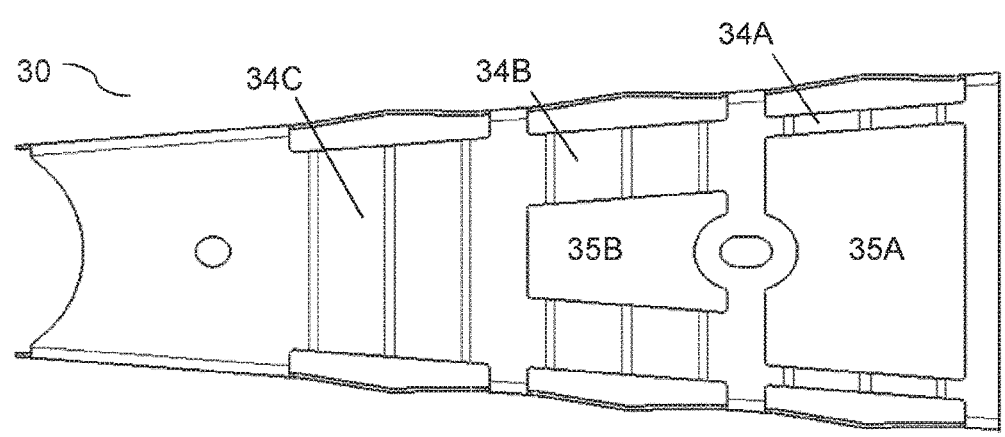

Optional, each one of the plurality of the first deformation segments and the plurality of the second deformation segments may further be adjusted before installation of the energy-absorbing knee bolster frame. The deformation segments can be adjusted in several different ways, as illustrated in FIGS. 4a through 4c. Hence, turning now to FIGS. 4a to 4c, in some example embodiments, each one of the plurality of the first deformation segments and the plurality of the second deformation segments here comprises at least one adjustable deformation segment enabling an adjustment of the deformation level of the adjustable deformation segment. In this manner, it becomes possible to provide a flexible knee bolster frame in the sense that the deformation levels can be easily and quickly adaptable prior to installation in the vehicle so as to meet desired requirements of the vehicle. In addition, the adjustment of the deformation level of the adjustable deformation segment can be performed at low cost and without advanced equipment.

Typically, the deformation level of the at least one adjustable deformation segment is adjusted by amending the shape of the opening of the at least one adjustable deformation segment. As an example, the adjustment of a deformation segment may be obtained by removing a piece of material from the deformation segment. In this respect, FIG. 4a illustrates a side view of the first example embodiment of an energy-absorbing knee bolster frame as shown in e.g. FIGS. 2a and 2c, in which the transverse bracket member 30 comprises the plurality of first deformation segments 34A-34C. In this figure, each deformation segment 34A-34C includes an opening 35A-N and a corresponding pre-bent region 36A-N arranged along a transverse length of the opening for initiating a deformation of a corresponding deformation segment in a transverse direction Y when the knee bolster frame 10 is subjected to a force from the knee 80 of the occupant P upon a collision, as mentioned above.

The configuration of the transverse bracket member 30 as shown in FIG. 4a here illustrates a transverse bracket member 30 prior to any adjustment of the deformation segments, and prior to installation of the knee bolster frame 10 in the vehicle.

Moreover, as is clearly shown in FIG. 4a, the size of the first opening 35A is larger than the size of the second opening 35B. Herby, the deformation level of the first deformation segment 34A is less than the deformation level of the second deformation segment 34B. Analogously, the size of the second opening 35B is larger than the size of the third opening 35C. Herby, the deformation level of the second deformation segment 34B is less than the deformation level of the third deformation segment 34C. As mentioned above, this type of configuration of the energy-absorbing transverse bracket member provides that the plurality of the first deformation segments comprises deformation segments having different deformation levels. Analogously, if a reference is made to the second transverse bracket member, this type of configuration of the second energy-absorbing transverse bracket member provides that the plurality of the second deformation segments comprises deformation segments having different deformation levels.

Turning now to FIG. 4b, a configuration of the transverse bracket member 30' (as shown in FIG. 4a) is here depicted in which the first deformation segment 34A (of the first energy-absorbing transverse bracket member) has been adjusted by making the first opening 35A larger compared to the configuration as shown in FIG. 4a. That is, the deformation level has been decreased compared to the configuration of the first opening 35A as shown in FIG. 4a. In addition, the second deformation segment 34B has here been adjusted by making the second opening 35B larger compared to the configuration as shown in FIG. 4a. That is, the deformation level has been decreased compared to the configuration of the second opening 35B as shown in FIG. 4a. Accordingly, FIG. 4b illustrates the first energy-absorbing transverse bracket member 30 after an adjustment of the deformation segments, but typically prior to installation of the knee bolster frame 10 in the vehicle.

Accordingly, FIG. 4b shows a configuration of the first deformation segment 34A in which the first deformation segment 34A and the second deformation segment 34B have been adjusted by removing one or several pieces of material. In other words, the energy-absorbing knee bolster frame 10 here comprises an energy-absorbing transverse bracket member 30' wherein at least one of the plurality of the first deformation segments and the plurality of the second deformation segments comprises at least one adjustable deformation segment enabling an adjustment of the deformation level of the adjustable deformation segment. Further, the deformation level of the at least one adjustable deformation segment is adjusted by amending the shape of the opening of the at least one adjustable deformation segment. To this end, a deformation segment of the first energy-absorbing transverse bracket has been adjusted so as to amend the deformation level of the deformation segment.

It should be readily appreciated that the configuration and the adjustments of the first energy-absorbing transverse bracket 20 may likewise be applied to the second energy-absorbing transverse bracket 30.

Hereby, it becomes possible to provide an energy-absorbing knee bolster frame, in which the level of deformation can be adapted according to wishes in order to better meet requirements as to user-specific energy-absorbing knee bolster frames.

It should be readily appreciated that the configuration of the first energy-absorbing transverse bracket 20 and the second energy-absorbing transverse bracket 30, as described in relation to FIGS. 4a and 4b may be implemented or arranged in any energy-absorbing knee bolster frame as described in relation to the previous figures, e.g. FIGS. 1a-1c, 2a-2b and FIGS. 3a-3b.

Typically, although not strictly required, all deformation segments in the plurality of the first deformation segments and the plurality of the second deformation segments are adjustable deformation segments. Also this type of configuration of the deformation segments may be applied to any energy-absorbing knee bolster frame as described in relation to the previous figures, e.g. FIGS. 1a-1c, 2a-2c and FIGS. 3a-3b.

FIG. 4c schematically illustrates an example embodiment of an energy-absorbing knee bolster frame as described in relation to e.g. in FIGS. 2a and 2c, in which an energy-absorbing transverse bracket member, e.g. the first energy-absorbing transverse bracket member 30, is provided with a plurality of deformation segments comprising a first deformation segment 34A and a second deformation segment 34B. This type of configuration may include any one of the features or effects as mentioned above with respect to FIGS. 1a-1c, 2a-2b and FIGS. 4a-4b. In addition, in this example embodiment, the energy-absorbing transverse bracket member can be adjusted by removing a piece of material from any one of the first deformation segment 34A and a second deformation segment 34B. In addition, or alternatively, in this example embodiment, the energy-absorbing transverse bracket member can be adjusted by removing a piece of material from a third deformation segment to form an energy-absorbing transverse bracket member provided with a plurality of deformation segments comprising the first deformation segment 34A and the second deformation segment 34B and the third deformation segment 34C. Accordingly, there is provided an energy-absorbing transverse bracket member in which a deformation segment 34C of the energy-absorbing transverse bracket has been adjusted so as to amend the deformation level of the deformation segment.

Furthermore, upon adjustment of the bracket member, there is provided an energy-transverse transverse bracket member wherein the plurality of the deformation segments comprises deformation segments having different deformation levels.

In all example embodiments as described in relation to the figures, it should be readily appreciated that the ultimate dimensions of the components making up the energy-absorbing knee bolster frame are typically selected depending on the use, function and installation of the frame into the vehicle. Merely as an example, a thickness of the longitudinal knee contact member in the transverse direction X may be about 1-2 mm. However, other dimensions are conceivable. In addition, a length of the longitudinal knee contact member 20 in the longitudinal direction X may be about 350-450 mm. Furthermore, a height of the longitudinal knee contact member 20 in the direction Z may be about 120-180 mm. The dimensions of the knee contact member are typically selected so as to ensure that the member is configured to support both knees of the occupant. Hence, other dimensions are conceivable depending on the use and installation of the energy-absorbing knee bolster frame 10.

As mentioned above the energy-absorbing knee bolster frame 10 according to example embodiments may be connected to the instrument panel 90. Alternatively, an instrument panel may be provided comprising an energy-absorbing knee bolster frame 10 according to any one of the example embodiments described herein.

It should be readily appreciated that although the description herein refers to cross sections of the energy-absorbing transverse bracket member in the form of U-shaped cross section, the cross section may in some example embodiments be formed by another open profile such as an E-shaped cross section, I-shaped cross section, H-shaped cross section or the like.

Turning now to FIGS. 3a and 3b, there is depicted an energy-absorbing knee bolster frame 10 according to example embodiments, in which the knee bolster frame is connected to the instrument panel and when an occupant is seated in front of the instrument panel. FIG. 3a illustrates an example embodiment of the energy-absorbing knee bolster frame 10 in an operational state prior to a collision, while FIG. 3b illustrates the example embodiment of the energy-absorbing knee bolster frame 10 in an operational state upon a collision, in which the energy-absorbing knee bolster frame 10 is partly deformed due to the forces generated during the collision causing a knee of an occupant to move in the transverse direction Y of the energy-absorbing knee bolster frame 10. As shown in the figures, the first deformation segment of the energy-absorbing transverse bracket member has been deformed, as shown in FIG. 3b, due to the forces from a movement of the knee of the occupant. The deformation of the first deformation segment 34A has been initiated due to having a deformation segment with a pre-bent frame region 36A and/or pre-bent frame region 36A', which here provides a weakening region of the first deformation segment (and for the entire energy-absorbing transverse bracket member). In addition, as the first deformation segment 34A comprises the largest opening 35A, it is readily appreciated that the deformation initially occurs in the first deformation segment 34A, and then possibly continues with the second deformation segment 34B and the third deformation segment 34C depending on the level of the forces from the knee of the occupant and the severity of the collision.

As exemplified by the example embodiments above in relation to the FIGS. 1a through 4c, it becomes possible to provide an energy-absorbing knee bolster frame configured for absorbing energy generated upon and during a collision or traffic incident by the configuration of the first energy-absorbing transverse bracket member and the second energy-absorbing transverse bracket member. The first energy-absorbing transverse bracket member and the second energy-absorbing transverse bracket member absorbs energy by means of the arrangement of the deformation segments including the opening and the corresponding pre-bent frame region. In other words, the frame is based on two parts, i.e. the first energy-absorbing transverse bracket member and the second energy-absorbing transverse bracket member, that are configured to absorb energy during deformation.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

What is claimed is:

1. An energy-absorbing knee bolster frame for a vehicle, comprising a longitudinal knee contact member, a first energy-absorbing transverse bracket member and a second energy-absorbing transverse bracket member, wherein said first energy-absorbing transverse bracket member and said second energy-absorbing transverse bracket member extend in a transverse direction (Y) and are arranged spaced apart on said longitudinal knee contact member,
the longitudinal knee contact member having a knee contact surface for receiving a part of a knee of an occupant (P) upon a collision,
the first energy-absorbing transverse bracket member having a cross section defining an open profile, and being adapted at one end to engage with a vehicle interior component, and further comprising a plurality of first deformation segments configured for absorbing energy generated by a knee impact, wherein each one of the deformation segments includes an opening and a corresponding pre-bent frame region arranged along a transverse length of said opening for initiating a deformation of a corresponding deformation segment in the transverse direction (Y) when said knee bolster frame is subjected to a force from the knee of an occupant (P) upon a collision,
the second energy-absorbing transverse bracket member having a cross section defining an open profile, and being adapted at one end to engage with a vehicle interior component, and further comprising a plurality of second deformation segments configured for absorbing energy generated by a knee impact, wherein each one of the deformation segments includes an opening and a corresponding pre-bent frame region arranged along a transverse length of said opening for initiating a deformation of a corresponding deformation segment in the transverse direction (Y) when said knee bolster frame is subjected to a force from the knee of an occupant (P) upon a collision, and
wherein the open profile of the first energy-absorbing transverse bracket member is defined by a first profile flange and a second profile flange extending from an intermediate member and the open profile of the second energy-absorbing transverse bracket member is defined by a first profile flange and a second profile flange extending from an intermediate member.

2. The energy-absorbing knee bolster frame according to claim 1, wherein any one of the pre-bent frame regions is defined by a substantially convex shaped region as seen with respect to a plane defined by the transverse direction (Y) and a vertical direction (Z).

3. The energy-absorbing knee bolster frame according to claim 2, wherein each one of the plurality of the first deformation segments and the plurality of the second deformation segments comprises deformation segments having different deformation levels.

4. The energy-absorbing knee bolster frame according to claim 3, wherein the plurality of the first deformation segments and the plurality of the second deformation segments are configured so that the deformation levels of the plurality of the first deformation segments and the plurality of the second deformation segments increase for each following pair of deformation segments along the transverse direction (Y), as seen from the longitudinal knee contact member.

5. The energy-absorbing knee bolster frame according to claim 4, wherein each one of the plurality of the first deformation segments and the plurality of the second deformation segments comprises at least one adjustable deformation segment enabling an adjustment of the deformation level of the adjustable deformation segment.

6. The energy-absorbing knee bolster frame according to claim 5, wherein:
said energy-absorbing knee bolster frame is generally U-shaped;
said frame is made of steel, including standard steel, high strength steel or stainless steel;
a thickness of the longitudinal knee contact member in the transverse direction is about 1-2 mm; and a length of the longitudinal knee contact member in the longitudinal direction is about 350-450 mm and/or a height of the longitudinal knee contact member in a direction (Z) is about 120-180 mm.

7. The energy-absorbing knee bolster frame according to claim 6, wherein any one of the first deformation segments comprises a pair of pre-bent frame regions arranged on opposite sides of the opening of the deformation segment and at a substantially equal distance from a transverse centre line (L) of said opening, and/or wherein any one of the second deformation segments comprises a corresponding pair of pre-bent frame regions arranged on opposite sides of the corresponding opening of the deformation segment and at a substantially equal distance from a transverse centre line (L') of said corresponding opening.

8. An instrument panel comprising the energy-absorbing knee bolster frame according to claim 7.

9. A vehicle comprising the energy-absorbing knee bolster frame according to claim 7.

10. The energy-absorbing knee bolster frame according to claim 1, wherein each one of the plurality of the first deformation segments and the plurality of the second deformation segments comprises deformation segments having different deformation levels.

11. The energy-absorbing knee bolster frame according to claim 10, wherein each one of the plurality of the first deformation segments and the plurality of the second deformation segments comprises at least one adjustable deformation segment enabling an adjustment of the deformation level of the adjustable deformation segment.

12. The energy-absorbing knee bolster frame according to claim 11, wherein the deformation level of the at least one adjustable deformation segment is adjusted by amending the shape of an opening of the at least one adjustable deformation segment.

13. The energy-absorbing knee bolster frame according to claim 11, wherein all deformation segments in the plurality of the first deformation segments and the plurality of the second deformation segments are adjustable deformation segments.

14. The energy-absorbing knee bolster frame according to claim 1, wherein the plurality of the first deformation segments and the plurality of the second deformation segments are configured so that the deformation levels of the plurality of the first deformation segments and the plurality of the second deformation segments increase for each following pair of deformation segments along the transverse direction (Y), as seen from the longitudinal knee contact member.

15. The energy-absorbing knee bolster frame according to claim 1, wherein said energy-absorbing knee bolster frame is generally U-shaped.

16. The energy-absorbing knee bolster frame according to claim 1, wherein said frame is made of steel, including standard steel, high strength steel or stainless steel.

17. The energy-absorbing knee bolster frame according to claim 1, wherein a thickness of the longitudinal knee contact member in the transverse direction is about 1-2 mm.

18. The energy-absorbing knee bolster frame according to claim 1, wherein a length of the longitudinal knee contact member in the longitudinal direction is about 350-450 mm and/or a height of the longitudinal knee contact member in a direction (Z) is about 120-180 mm.

19. The energy-absorbing knee bolster frame according to claim 1, wherein any one of the first deformation segments comprises a pair of pre-bent frame regions arranged on opposite sides of the opening of the deformation segment and at a substantially equal distance from a transverse centre line (L) of said opening, and/or wherein any one of the second deformation segments comprises a corresponding pair of pre-bent frame regions arranged on opposite sides of the corresponding opening of the deformation segment and at a substantially equal distance from a transverse centre line (L') of said corresponding opening.

20. A vehicle comprising an instrument panel including an energy-absorbing knee bolster frame, the energy-absorbing knee bolster frame comprising:
a longitudinal knee contact member;
a first energy-absorbing transverse bracket member; and
a second energy-absorbing transverse bracket member,
wherein:
said first energy-absorbing transverse bracket member and said second energy-absorbing transverse bracket member extend in a transverse direction (Y) and are arranged spaced apart on said longitudinal knee contact member,
the longitudinal knee contact member having a knee contact surface for receiving a part of a knee of an occupant (P) upon a collision,
the first energy-absorbing transverse bracket member having a cross section defining an open profile, and being adapted at one end to engage with a vehicle interior component, and further comprising a plurality of first deformation segments configured for absorbing energy generated by a knee impact, wherein each one of the deformation segments includes an opening and a corresponding pre-bent frame region arranged along a transverse length of said opening for initiating a deformation of a corresponding deformation segment in the transverse direction (Y) when said knee bolster frame is subjected to a force from the knee of an occupant (P) upon a collision,
the second energy-absorbing transverse bracket member having a cross section defining an open profile, and being adapted at one end to engage with a vehicle interior component, and further comprising a plurality of second deformation segments configured for absorbing energy generated by a knee impact, wherein each one of the deformation segments includes an opening and a corresponding pre-bent frame region arranged along a transverse length of said opening for initiating a deformation of a corresponding deformation segment in the transverse direction (Y) when said knee bolster frame is subjected to a force from the knee of an occupant (P) upon a collision, and
the open profile of the first energy-absorbing transverse bracket member is defined by a first profile flange and a second profile flange extending from an intermediate member and the open profile of the second energy-absorbing transverse bracket member is defined by a first profile flange and a second profile flange extending from an intermediate member.

* * * * *